United States Patent Office 3,503,510
Patented Mar. 31, 1970

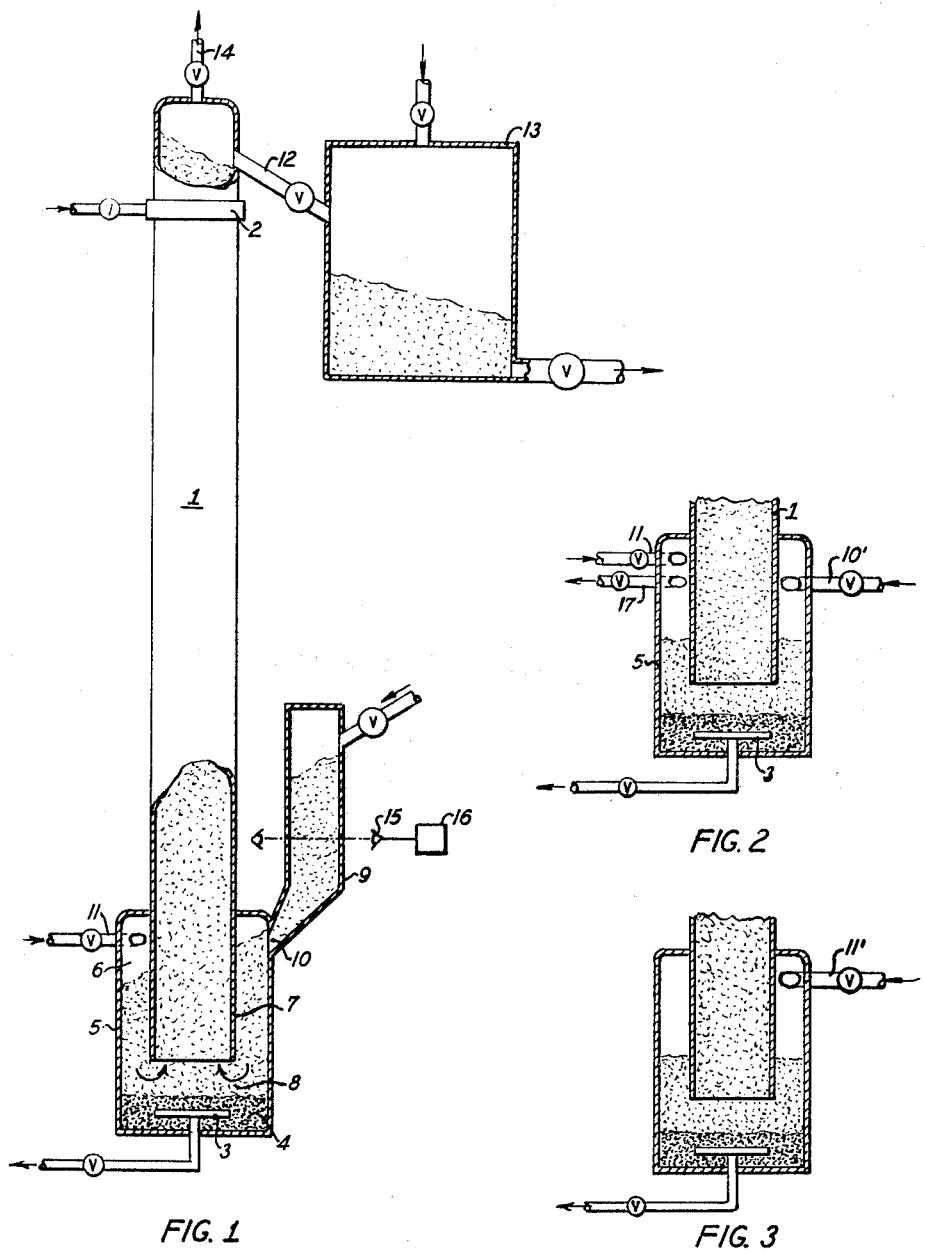

3,503,510
INSTALLATION FOR TREATING LIQUIDS
AND GRANULAR SOLIDS
Paul Minart, Grenoble, Claude Blain, Palaiseau, Roger Platzer, Chatillon-sous-Bagneux, and Jean-Claude Gervraud, Grenoble, France, assignors to Comissariat a l'Energie Atomique (C.E.A.), Paris, France, and Societe Grenoblois d'Etudes et d'Applications Hydrauliques, Grenoble, France, a corporation of France
Filed May 19, 1967, Ser. No. 639,824
Claims priority, application France, May 20, 1966, 4,939
Int. Cl. B01d 23/10
U.S. Cl. 210—189
6 Claims

ABSTRACT OF THE DISCLOSURE

The installation comprises a cylindrically-shaped column enclosed at its lower portion by a closed annular chamber which is in communication with the lower end of the column and into which the fresh granular solids and liquid under pressure are fed.

---

This invention relates to installations designed to bring liquids into contact with granular solids, such as for example, in ion exchange installations. In those installations of the type with which the invention is particularly concerned, the liquid and solid are brought into contact by flowing them in opposite directions in an upright column or vessel in such manner that the solid to be exchanged forms a bed that is made to progress upwardly in steps by short periodic injections of substantial liquid flows at the foot of the column, so that the liquid carries along with it a quantity of solid material equivalent to one step forward of the bed at a time. At each such step forward, a spilling device at the top of the column directs a corresponding quantity of material to a receiver or transfer device, and between each step forward the liquid to be treated is injected through a feed near the top of the bed of material in the upper portion of the column and passes down through such bed and out at the bottom of the column.

In the installations which have heretofore been used or suggested, it has been extremely difficult to successfully feed fresh material into the bottom of large-diameter industrial treatment beds in a manner as to ensure even distribution of the material, which is an essential requisite for steady progression of the bed in successive layers and necessary for satisfactory treatment and high output of such an installation. Thus, in conventional systems the granular material and the liquid impulse causing the bed to advance, are usually fed into the bed through a pipe of smaller cross-sectional area than that of the column and which discharges underneath and in the middle of the bed. Experience has shown that if the pipe cross-section is too small, as compared to that of the column, it becomes practically impossible to inject consolidated material into the column even under very high pressure. It has been found that in order to be able to move a bed of consolidated material upwardly "en bloc," it is necessary to inject a substantial liquid flow at the bottom of the bed in order to make the loss of head of the bed equal to its bulk weight per unit cross-sectional area. Thus, when the feed pipe is not large enough for the column, this requirement will cause the material to become so tightly packed therein that the requisite flow of liquid cannot get through and the material cannot be moved. On the other hand, even if, in this prior type of installation, the cross-sectional area of the feed pipe is made sufficiently large to permit the impelling fluid to flow therein, the solid material that is fed into the bottom of the column will move outwardly from the center of the bed toward the periphery thereof in a diverging fashion so that the area to be fed increases from the central feed section and there will not be obtained an even distribution of material over the bottom of the column.

The primary purpose of this invention is to provide an improved installation which does not have the aforesaid disadvantages of the prior installations.

In accordance with the invention there is provided an installation which is so designed that the fresh solid material is supplied to the bottom of the bed as an evenly distributed layer when each periodic impulse of liquid under pressure occurs to progress the bed forwardly, and that the bed is kept stationary at the bottom of the column during the intermittent treatment periods.

The characteristic features of the installation of this invention are (1) that the lower part of a generally cylindrically-shaped column is enclosed by an annular chamber which is coaxial with respect to the column, surrounds it up to a certain level, and communicates with the lower end of the column through a continuous annular opening, (2) that the fresh material fills the annular chamber up to a given minimum height above said annular opening, and (3) that a space filled with liquid is provided at the top of the chamber. Means are provided to supply the chamber with fresh solid material up to a given maximum height, and periodically to supply above such maximum level, the liquid under pressure which is designed to provide the impulse for causing the solid material to be transferred from the annular chamber, through the annular opening, and to the bottom of the treatment bed.

For a better understanding of the invention and its features and advantages, reference is made to the following description which should be read in connection with the accompanying drawings which show by way of example certain possible concrete forms in which the invention may be practiced.

In the drawings, FIG. 1 is an elevational schematic view of an installation embodying the invention;

FIG. 2 is a schematic view of the lower portion of a modified form of the installation; and FIG. 3 is a view similar to FIG. 2 showing another modification.

Referring more particularly to FIG. 1 of the drawings, the numeral 1 indicates generally a cylindricallyshaped reverse flow treatment column containing the granular material in the form of a bed that moves periodically upwardly and through which the liquid undergoing treatment circulates downwardly after entering the column through a peripheral annulus 2 connected to a suitable source of such liquid. The treated liquid discharges at the bottom of the column through a strainer 3 which may be embedded in a bed of sand 4 in a known manner. In accordance with the invention, the lower part 7 of the column is enclosed by a cylindrically-shaped casing 5 which forms with such column part 7 an annular chamber 6. The bottom end of the column part 7 terminates at a certain distance above the sand bed 4 to provide an annular peripheral opening 8 which puts the chamber 6 into communication with the column 1. It is preferred that the area of the opening 8 should be approximately the same as the horizontal cross-sectional area of the annular chamber 6 and as the cross-sectional area of the column 1.

The fresh granular material is fed into the installation from a storage tank 9 which discharges through an orifice 10 into the annular chamber 6 where the granular material forms a heap which gradually grows in height until it blocks the orifice 10, as shown in FIG. 1, and thereby cuts off the material feed. The orifice 10 therefore functions as a means for checking the level of the solid material in the annular chamber 6 and should be so located in the casing 5 that the solid material will not rise above a maximum level which is consistent with the need to maintain above the solid material a sufficiently large space full of liquid to enable satisfactory distribution of the flow of impelling fluid. On the other hand, the orifice 10 should be so located that the level of the solid material heap or pile will not fall below a given minimum height so as to ensure that the depth of material in the annular chamber 6 above the opening 8 is sufficient to prevent the flow of the impelling liquid along preferential paths at certain points in the annular chamber when the periodic impulses causing the bed to advance occur, and thereby to provide an evenly distributed granular material feed through the peripheral opening 8 when the bed progresses one step forward under each impulse of the impelling fluid. Experience has shown that this minimum height of the solid material level should be approximately 30 centimeters above the opening 8 in the case of a column 50 centimeters in diameter, and about from 40 to 50 centimeters above the opening 8 for a column from 1.5 to 2 meters in diameter.

The impelling liquid is supplied to the said space in the upper end of the annular chamber 6 through a pipe 11 connected to a suitable source of such liquid in a known manner. Injection of the impelling flow into the annular chamber should preferably be in a tangential direction, as shown, so as to ensure satisfactory distribution of the liquid. As the solid material progresses upwardly through the column 1 in a step-by-step fashion under the periodic impulses of the impelling liquid and into the upper part of such column, it passes out through a sloping pipe 12 the entry end of which is located at a certain height above the annulus 2. The pipe 12 discharges the material into a storage or transfer tank 13 from which the material is removed in a known manner. The impelling liquid discharges out through a pipe 14 at the top of the column 1. The various feed and outlet pipes are provided with automatic valves controlled according to a program in any known way.

It will be understood from the foregoing that while the liquid to be treated is flowing from the delivery annulus 2 and down through the bed in the column 1, the treated liquid will be discharging through the strainer 3 embedded in the sand bed 4. On completion of the treatment process, the fluid inlet 2 and the treated fluid delivery device 3 are closed and the impelling liquid feed and discharge pipes 11 and 14, respectively, are opened. The impelling liquid will then be fed into the annular chamber 6 and it will act to carry part of the granular material in such chamber with it "en bloc" through the opening 8 and inside the column 1. The impulse is set to ensure that the material level within the annular chamber does not sink below the minimum level required for satisfactory distribution of the feed of material to the opening 8. It will be observed that during such impulse the material feeds from the peripheral opening 8 towards the center of the column. This converging flow it has been found is particularly favorable to even distribution, for as the granular material progresses farther away from the peripheral feed section, i.e., the annular feed opening 8, the size of the area to be applied decreases. On completion of an impulse, pipes 11 and 14 will close, and the liquid inlet 2, the treated delivery strainer 3 and the outlet pipe 12 will all open.

As soon as the level of the granular material in the annular chamber 6 falls because of an impulse, the orifice 10 is enabled to start discharging fresh material from the storage tank 9 and will continue to do so until such time as the heap has again risen to a sufficient height to cover the orifice and thereby shut off the feed. The granular material is preferably fed into the annular chamber through the orifice 10 in a direction against that in which the impelling fluid is fed into such chamber. The rate of flow of the granulated material through the orifice 10 is calculated to ensure that the orifice will be again closed before the next impulse of the impelling liquid is triggered off. Thus, as the installation is operated, the level of the granular material in the annular chamber will be maintained between a maximum and a minimum, a condition which has been found to be essential for satisfactory automatic operation of the same. As indicated in FIG. 1, a photocell 15 may be provided to detect when the material level in the storage tank 9 falls too low, and when this occurs an electrical signal may be sent to a suitable control device 16 arranged to momentarily shut down the column in a manner within the skill of the art.

It has been found that the feed arrangements to the annular chamber shown in FIG. 1 of the drawings are very suitable where the column diameter does not exceed a few multiples of 10 centimeters. When the column diameter is above about 50 centimeters, however, the banked up heap of material becomes so much larger that it is necessary to increase the height of the lower part 7 of the column because the minimum height of material must be maintained throughout the periphery of the chamber and especially at the lowest part of the heap. In the case of large diameter columns therefore, the height of the installation may increase out of all proportion compared to the height of the bed which is strictly necessary for a given treatment. It has been found that in such cases, the material can be fed to accomplish the purposes of the invention by injecting it tangentially into the annular chamber by means of a liquid stream flowing at a velocity such that the material is conveyed all the way around the chamber and settles out to all intents and purposes in even horizontal layers. An installation of this type is indicated in FIG. 2 of the drawings wherein similar reference characters indicate the same parts shown in FIG. 1 of the drawings. The construction of FIG. 2 differs from FIG. 1 in that instead of feeding the solid material from a storage tank, such material is supplied as a liquid-solid mixture through a pipe 10' from a source of supply thereof and discharged tangentially into the annular chamber 6. This liquid stream is forced through the pipe 10' under a given pressure so that it will be caused to settle in substantially even horizontal layers. In this type of layout, the material can be fed in while the bed is stationary in between the treatment periods, and the displaced volume of liquid discharged through the treated liquid outlet 3. Alternatively, such displaced volume of liquid may be discharged through a pipe 17 specially provided for this purpose in the upper part of the chamber as shown in FIG. 2. It is also within the contemplation of the invention to time the feed of the liquid-solid mixture to occur when the bed moves, in which case, as is shown in FIG. 3 of the drawings, the injected liquid flow will serve both to feed material to the annular chamber and to move the bed within the column, the feed pipe 11' of FIG. 3 therefore serving the purposes of the feed pipes 10' and 11 in the installation of FIG. 2.

While there has been hereinabove described and illustrated in the drawings various examples of the invention, it will be understood by those skilled in the art that various other embodiments may be utilized without departing from the spirit of the invention or the scope of the appended claims.

What is claimed is:

1. An installation for treating liquids and granular solids comprising a substantially vertically disposed tubular-shaped column providing a treatment chamber for a bed of the granular material, means for supplying treatment liquid to the bed of granular material, means for discharging the treatment liquid circulated through said bed, a tubular casing enclosing the lower portion of said column and forming with the latter a tubular substantially unrestricted chamber of given height, the lower portion of said column having an annular peripheral substantially unrestricted opening extending around a transverse section thereof to bring the treatment chamber of said column into communication with the lower portion of said tubular chamber, and means operable intermittently to supply by gravity said tubular chamber with successive charges of fresh granular material in sufficient quantity up to a given level as to assure the maintenance in such chamber of a minimum head of such material above said annular opening after each impulsion of such material through such opening, and means to supply successive charges of liquid directed tangentially under pressure into the area of such chamber above the granular material therein and of such pressure and duration as to propel successive charges of the granular material from the tubular chamber through such opening into the treatment chamber.

2. An installation as defined in claim 1, in which said column is generally cylindrically-shaped and said tubular chamber is annular and coaxial with respect to said column, said tubular chamber having a bed of sand at the bottom thereof and the bottom end of said column being spaced above said bed of sand, said opening being located between the bottom of said column and said bed of sand and extending substantially continuously around said treatment chamber at the base thereof.

3. An installation for treating liquids and granular solids comprising a substantially vertically disposed tubular-shaped column providing a treatment chamber for a bed of the granular material, means for supplying treatment liquid to the bed of granular material, means for discharging the treatment liquid circulated through said bed, a tubular casing enclosing the lower portion of said column and forming with the latter a tubular substantially unrestricted chamber of given height, the lower portion of said column having an annular peripheral substantially unrestricted opening extending around a transverse section thereof to bring the treatment chamber of said column into communication with the lower portion of said tubular chamber, and means operable intermittently to supply said tubular chamber with successive charges of fresh granular material in sufficient quantity as to assure the maintenance in such chamber of a minimum head of such material above said opening after each impulsion of such material through such opening, and with successive charges of liquid under pressure into the area of such chamber above the granular material therein and of such pressure and duration as to propel successive charges of the granular material from the tubular chamber through such opening into the treatment chamber, said supplying means discharging said material and liquid tangentially into said tubular chamber and supplying said material as a liquid stream.

4. An installation as defined in claim 3, in which said supplying means includes means for discharging the liquid tangentially into said tubular chamber at one place in the upper portion thereof, and means for discharging the liquid stream of material tangentially into said tubular chamber at another place in the upper portion thereof spaced from said one place.

5. An installation as defined in claim 4, including outlet means for the liquid discharged into said tubular chamber located at a third place in the latter.

6. An installation as defined in claim 3, in which said supplying means discharges said material and liquid tangentially into said tubular chamber as a single liquid stream.

References Cited

UNITED STATES PATENTS

| | | | |
|---|---|---|---|
| 2,693,395 | 11/1954 | Berg | 210—33 X |
| 3,056,743 | 10/1962 | Eichhorn et al. | 210—33 |

SAMIH N. ZAHARNA, Primary Examiner